United States Patent
Al Daif

(10) Patent No.: US 11,598,199 B2
(45) Date of Patent: Mar. 7, 2023

(54) SYSTEM AND METHOD FOR RETRIEVING A SOURCE ELEMENT FROM A LOGGING TOOL LOCATED IN A WELL

(71) Applicant: SAUDI ARABIAN OIL COMPANY, Dhahran (SA)

(72) Inventor: Mohammed Y. Al Daif, Al Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 357 days.

(21) Appl. No.: 17/015,393

(22) Filed: Sep. 9, 2020

(65) Prior Publication Data

US 2022/0074300 A1   Mar. 10, 2022

(51) Int. Cl.
*E21B 31/16* (2006.01)
*E21B 47/053* (2012.01)

(52) U.S. Cl.
CPC ............ *E21B 47/053* (2020.05); *E21B 31/16* (2013.01)

(58) Field of Classification Search
CPC ...................................................... E21B 31/16
See application file for complete search history.

(56) References Cited

U.S. PATENT DOCUMENTS

| | | | |
|---|---|---|---|
| 2,855,994 A | 10/1958 | Kammerer, Jr. | |
| 4,857,728 A * | 8/1989 | Smith, Jr. | ............. E21B 41/005 250/269.3 |
| 5,027,914 A | 7/1991 | Wilson | |
| 5,184,692 A * | 2/1993 | Moriarty | .................. G01V 5/08 175/50 |
| 5,205,167 A | 4/1993 | Gartner et al. | |
| 5,524,708 A | 6/1996 | Isaacs | |
| 5,718,291 A * | 2/1998 | Lorgen | .................... E21B 17/06 166/377 |
| 11,466,559 B2 * | 10/2022 | Evans | .................... E21B 49/003 |
| 2004/0104821 A1 | 6/2004 | Clark | |
| 2005/0199393 A1 | 9/2005 | Goldberg et al. | |
| 2020/0027607 A1 * | 1/2020 | Muller | ...................... G21F 9/36 |

FOREIGN PATENT DOCUMENTS

WO   2016040062 A1   3/2016

OTHER PUBLICATIONS

International Search Report and Written Opinion of the International Searching Authority issued in corresponding International Application No. PCT/US2020/055333, dated May 7, 2021 (16 pages).

* cited by examiner

*Primary Examiner* — Kipp C Wallace
(74) *Attorney, Agent, or Firm* — Osha Bergman Watanabe & Burton LLP

(57) ABSTRACT

A system for retrieving a source element from a well may include a logging tool made of a first material, a milling tool, and a control device. The logging tool may include a cylindrical housing having a central chamber housing the source element and extending through a portion of the cylindrical housing along a central axis thereof. The logging tool may include a first communication device mounted on the cylindrical housing. The milling tool may include a tubing mounting structure that secures the milling tool to a tubing of the well. The milling tool may include a drill bit head made of a second material, the drill bit head may be configured for milling through the first material. The control device may include a second communication device configured to communicate with the first communication device.

18 Claims, 14 Drawing Sheets

SYSTEM AND METHOD FOR RETRIEVING A SOURCE ELEMENT FROM A LOGGING TOOL LOCATED IN A WELL

BACKGROUND

Obtaining well information during well evaluation operations requires the use of logging tools to be lowered and raised along a wellbore. The logging tools are configured for sampling physical phenomena inside the wellbore and/or outside a casing of the wellbore. The logging tools may be lowered along the wellbore using a conveyance mechanism. In this regard, certain phenomena may require specialized equipment (i.e., devices including sensitive or radioactive materials) to be lowered for sampling one or more formation characteristics. As logging tools may be stuck in the wellbore during evaluation operations, it becomes necessary to retrieve the specialized equipment using specialized retrieving operations. Current specialized retrieving operations involve the use of rigs and piping that retrieve the entirety of the logging tool, which cause evaluations to be paused for several days until the entirety of the logging tool is removed from the wellbore.

SUMMARY

In general, in one aspect, embodiments disclosed herein relate to a system for retrieving a source element from a well. The system includes a logging tool made of a first material, a milling tool, and a control device. The logging tool includes a cylindrical housing having a central chamber housing the source element and extending through a portion of the cylindrical housing along a central axis thereof. The logging tool includes a first communication device mounted on the cylindrical housing. The milling tool includes a tubing mounting structure that secures the milling tool to a tubing of the well. The milling tool includes a drill bit head made of a second material, the drill bit head is configured for milling through the first material. The control device includes a second communication device configured to communicate with the first communication device. The control device includes a processor operatively connected to the second communication device that coordinates a position of the milling tool with respect to the central chamber of the logging tool including the source element.

In general, in one aspect, embodiments disclosed herein relate to a method for retrieving a source element from a well. The source element is located in a logging tool made of a first material that is deployed into the well for sampling at least one parameter in a formation. The logging tool includes a cylindrical housing having a central chamber including the source element and extending through a portion of the cylindrical housing along a central axis thereof, and a first communication device mounted on the cylindrical housing. The method includes determining whether the logging tool is stuck inside the well. The method includes when the logging tool is stuck inside the well, releasing the logging tool inside the well. The method includes deploying a milling tool made of a second material. The milling tool includes a tubing mounting structure that secures the milling tool to a tubing of the well. The milling tool includes a drill bit head made of the second material, the drill bit head is configured for milling through the first material. The method includes milling the logging tool up to a predetermined depth using the milling tool, the predetermined depth exposing a source element. The method includes retrieving the source element from the predetermined depth of the logging tool.

In general, in one aspect, embodiments disclosed herein relate to a logging tool of a first material configured to be milled through by a drill bit head made of a second material and disposed on a milling tool. The logging tool includes a cylindrical housing made of the first material and having a central chamber extending through a portion of the cylindrical housing along a central axis thereof. The logging tool includes a source element disposed in the central chamber. The logging tool includes a communication device mounted on the cylindrical housing and operatively connected to the first sensor. The milling tool includes tubing mounting structure that secures the milling tool to a tubing of the well.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
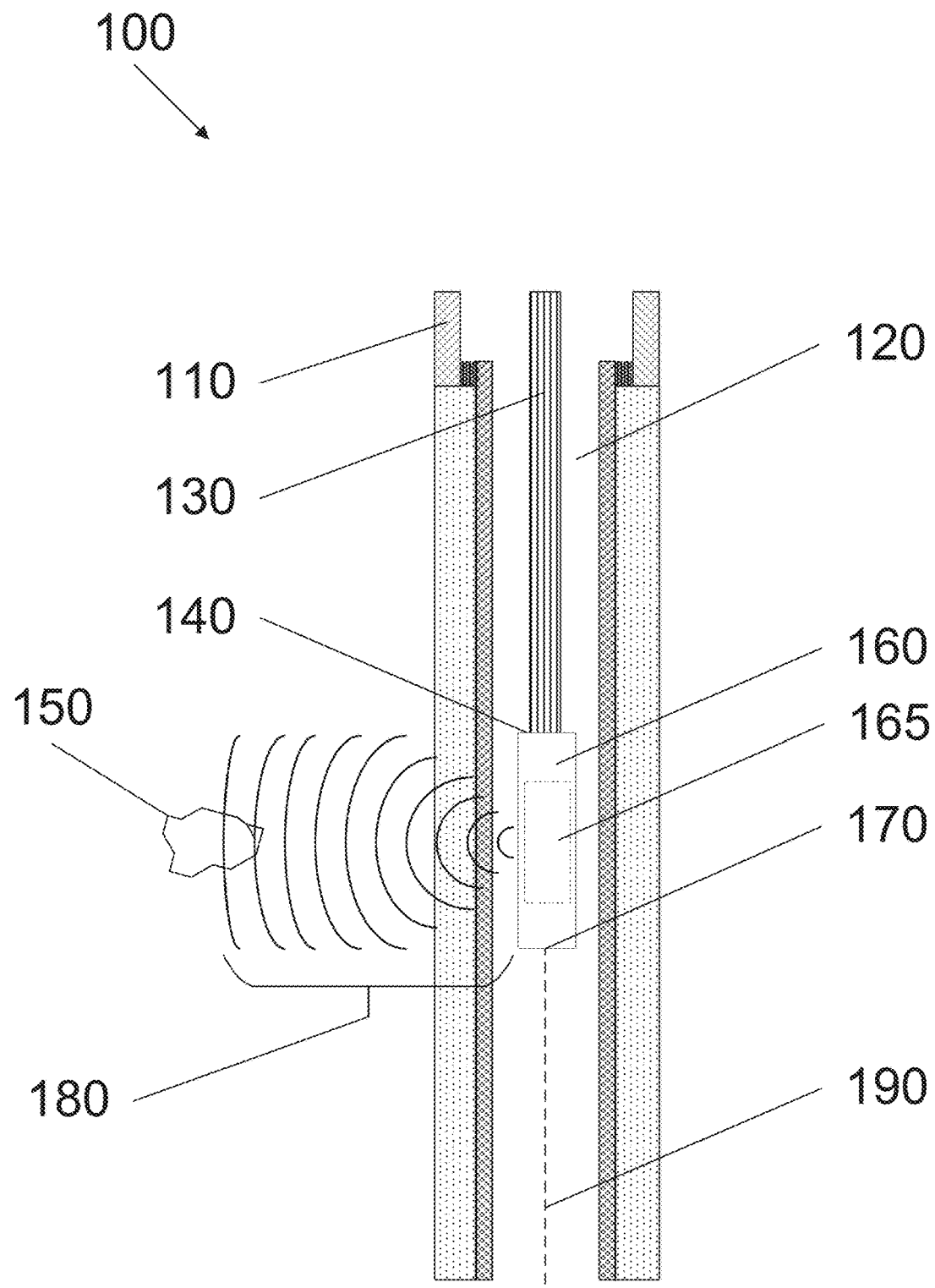
FIG. 1 shows a schematic diagram showing a cross-section view of a well including a logging tool in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for retrieving a source element from a logging tool located in a well. In some embodiments, the source element may be specialized equipment such as devices including sensitive or radioactive materials that are used in well evaluation operations. The source element may be excited or triggered to sample one or more characteristics of the wellbore or formations surrounding a casing of the wellbore. The logging tool may be used for obtaining well information during well evaluation operations. In some embodiments, the logging tool may include material that allows easy milling of the logging tool by using metallic milling tools. In this regard, the logging tool may include a non-metallic material that provides a robustness required for moving along the well while simultaneously providing an enclosure for holding the source element required for operating the logging tool while simultaneously sealing any electronics disposed in the logging tool.

In one or more embodiments, the logging tool includes non-metallic components that may be configured for being drilled through using the metallic milling tools. In some embodiments, the logging tool may be moved along a wellbore of the well using a wireline, a slickline, or drill pipe as part of a conveyance mechanism. In this case, the conveyance mechanism provides a reduced form factor which prevents the logging tool from being stuck on the casing of the wellbore. In a case where the logging tool is stuck, the logging tool may be drilled through to liberate space in the wellbore. Further, in a case where the logging tool includes a type of source element with radioactive characteristics, the logging tool may be drilled through to a predetermined depth such that the central chamber may be exposed and the source element may be extracted without using large conveyance mechanisms (i.e., including a rig). As such, the source element may be retrieved using a retrieving device using the same, or similar, conveyance mechanism to that used with the logging tool and/or the milling tool. In some embodiments, the logging tool minimizes the risk of using source elements with radioactive or electromagnetic characteristics by allowing retrieving tools to remove the source material directly from the central chamber. In some embodiments, the system and the method for retrieving the source element drastically reduces non-productive time to clear the wellbore as the system and the method do not require fishing the logging tool. In this regard, the system and the method reduce the risk for the source element to cause sidetracking or losing the well when the logging tool is stuck in the wellbore.

In one or more embodiments, the logging tool may include non-metallic materials such as high-density polyethylene. Polyethylene may be raised to a same temperature along with metal fragments or chips in the wellbore such that it may be drilled through. The logging tool may be drilled or milled to a depth associated with a marker point in the logging tool or the wellbore. The marker point may be used to identify a location of the central chamber. The depth of the marker point may be identified using communication devices located in the logging tool, the drilling tool, and/or a control system located at a well surface area.

FIG. 1 shows a schematic diagram illustrating a logging tool 160 disposed on a wellbore 120 of a well system 400. The logging tool 160 includes a central chamber 165 configured to contain, excite and evaluate a source element 800. The logging tool 160 may have a cylindrical housing that extends through the entire length of the logging tool 160 along a central axis 190. The logging tool 160 may be lowered and raised along the wellbore 120 to sample physical phenomena inside the wellbore 120 and/or outside a casing 110 of the wellbore 120. The logging tool 160 may be lowered along the wellbore 120 using a conveyance mechanism 130. In this regard, certain phenomena may require specialized equipment (i.e., devices including sensitive or radioactive materials) to be lowered for sampling one or more formation characteristics. As the logging tool 160 may be stuck in the wellbore 120 during evaluation operations, it becomes necessary to retrieve the specialized equipment using specialized retrieving operations. Current specialized retrieving operations involve the use of rigs and piping that retrieve the entirety of the logging tool, which cause evaluations to be paused for several days until the entirety of the logging tool 160 is removed from the wellbore 120. In some embodiments, the logging tool 160 includes a top portion 140 operably connected to a conveyance mechanism 130 that lowers and rises the logging tool 160 along the wellbore 120.

In some embodiments, the logging tool 160 may exchange information with a surface panel while avoiding the need to bring a rig to a well location to install tubing equipped with permanent downhole monitoring systems or thru-tubing retrievable intelligent completion systems. Such systems normally require removal for intervention jobs. A well intervention is any operation carried out on a hydrocarbon (i.e., oil and gas) well during or at the end of the production life of the well. Well intervention may function to alter the state of the hydrocarbon well and/or well geometry for providing well diagnostics or management of the production of the well. Well intervention jobs include, for example, pumping jobs, maintenance jobs, slickline jobs, coiled tubing jobs, perforation jobs, and workover jobs. An example of well intervention is when a logging tool/device is stuck in the wellbore 120.

In some embodiments, the central chamber 165 includes the source element 800 contained in with safety mechanisms for exciting and triggering responses from the source element 800. The central chamber 165 may be configured to generate various pulses 180 that propagate in a direction of a point of interest 150 outside the casing 110 of the wellbore 120. In some embodiments, the source element 800 is radioactive and the various pulses 180 are radioactive pulses as a result. Further, the logging tool 160 may include sensors and systems for collecting data relating to the well. In some embodiments, the logging tool 160 may include hardware and/or software for creating a secure wireless connection (i.e., a communication link) with the surface panel to insure real-time data exchanges and compliance with data protection requirements.

Figure 2:
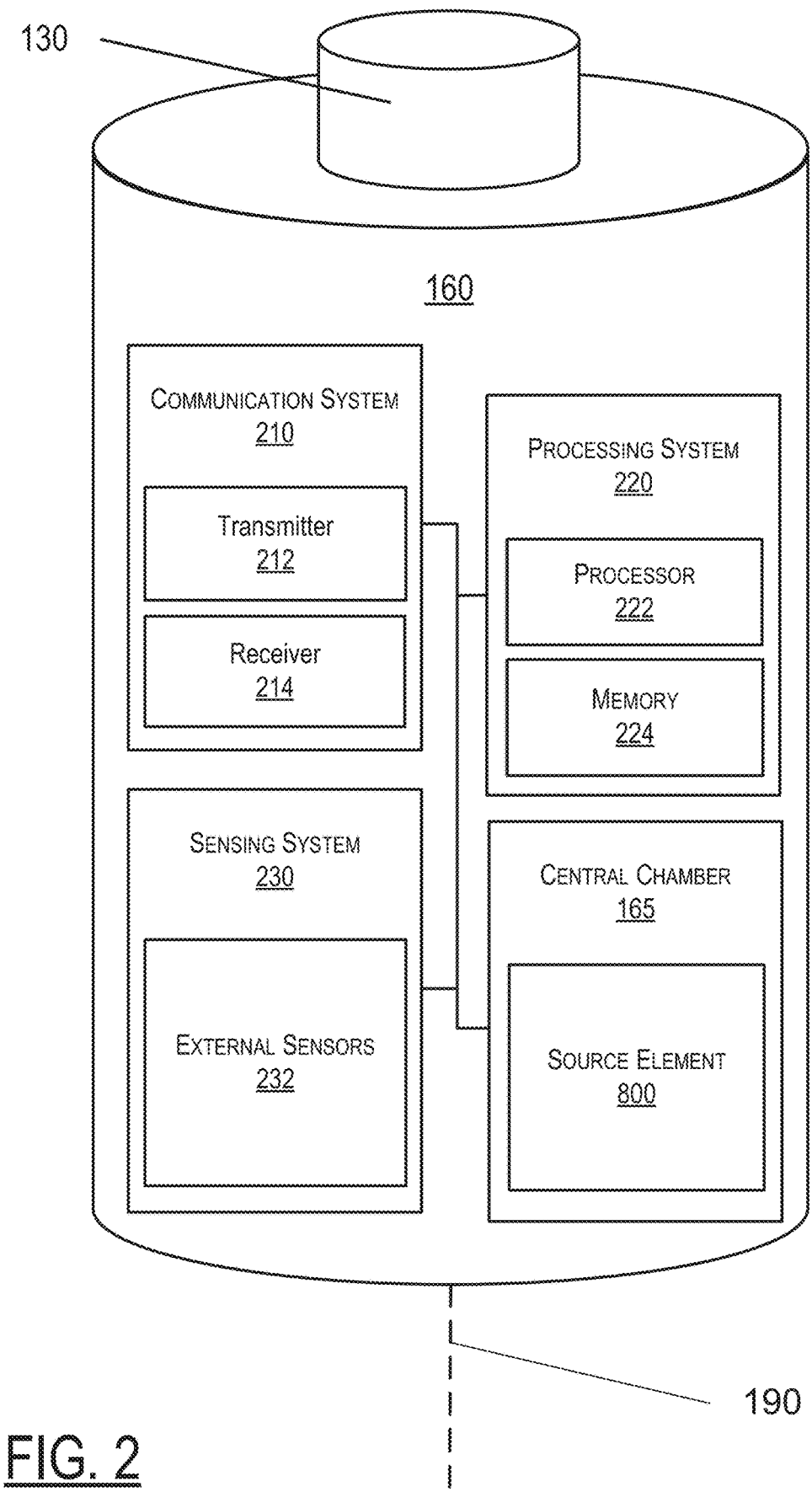
FIG. 2 shows a schematic diagram of a logging tool in accordance with one or more embodiments.

FIG. 2 shows a schematic diagram showing various systems that may be incorporated into the logging tool 160. In some embodiments, the logging tool 160 includes electronic components that enable the logging tool 160 to perform communication functions, data collecting functions, and/or processing functions. In some embodiments, the logging tool 160 includes communication system 210, processing system 220, and sensing system 230 coupled to the central chamber 165 containing the source element 800. The communication system 210 may include communication devices such as a transmitter 212 and a receiver 214. The transmitter 212 and the receiver 214 may transmit and receive communication signals, respectively. Specifically, the transmitter 212 and the receiver 214 may communicate with one or more control systems located at a remote location through a wired connection. In some embodiments, the communication system 210 may communicate wirelessly with the communication system 310 of the retrieving device 300. In some embodiments, the communication system 215 may act as a relay to transfer information from the device 170 to the control system 460 located at the well surface 470.

The processing system 220 may include a processor 222 and a memory 224. The processor 222 may perform computational processes simultaneously and/or sequentially. The processor 222 may determine information to be transmitted and processes to be performed using information received or collected. Similarly, the processor 222 may control collection and exchange of geospatial information from the logging tool 160.

The sensing system 230 may include external sensors 232. The external sensors 232 may be sensors that collect physical data from the environment surrounding the logging tool 160 (i.e., sensing conditions in the wellbore 110). The external sensors 232 may be lightweight sensors requiring a small footprint. These sensors may exchange information with each other and supply it to the processor 222 for analysis. The external sensors 232 may be logging tools of an electrical type, a nuclear type, a sonic type, or another type. The external sensors 232 may release signals (i.e., electrical, nuclear, or sonic) through a signal generator at a sensing portion.

In other embodiments, the logging tool 160 may additionally include or be limited to any mechanisms or functional capabilities to perform well testing, data collecting and analysis, and well intervention using the conveyance mechanism 130 via wireline and slickline as are known in the art.

Figure 3:
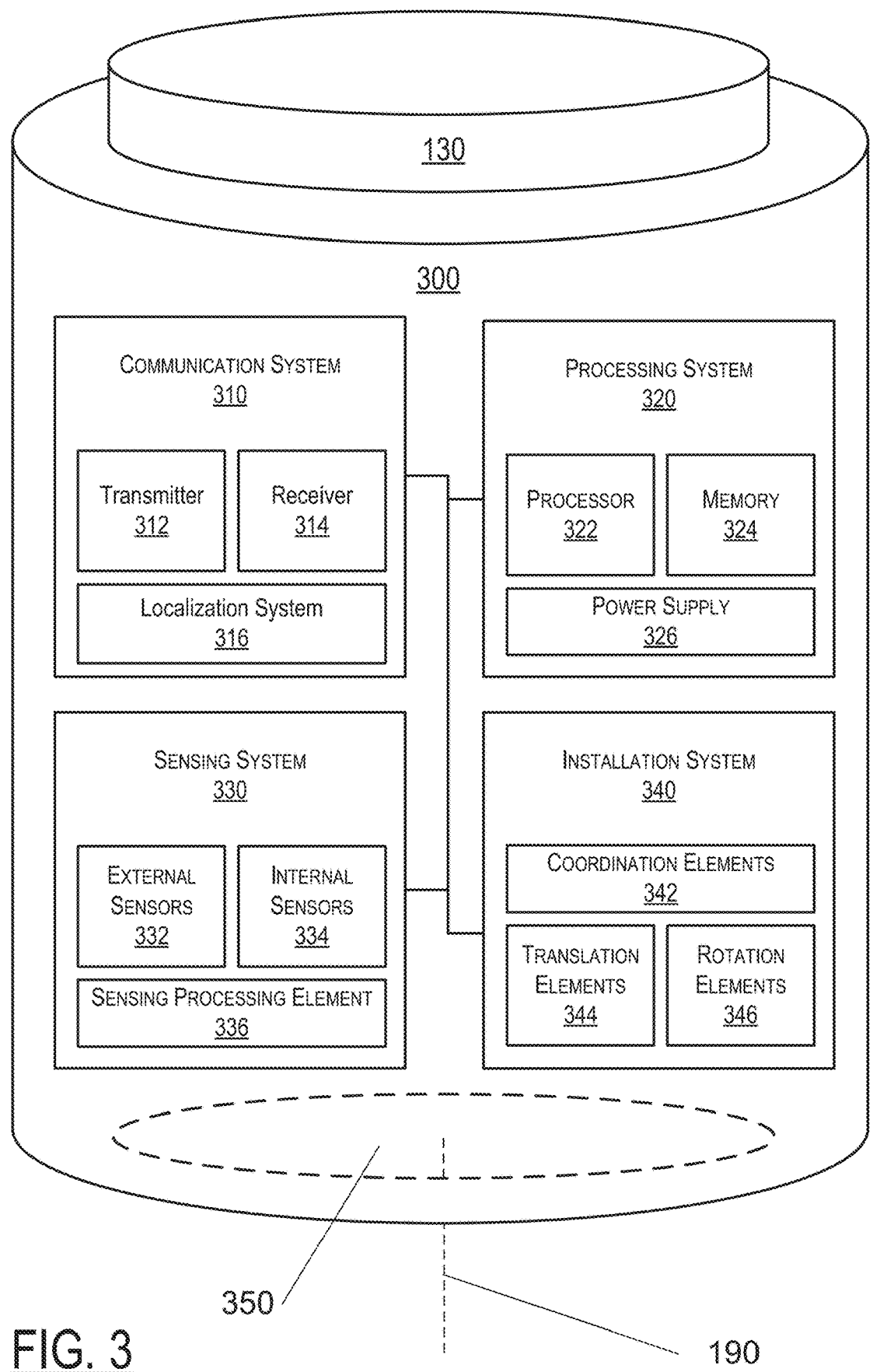
FIG. 3 shows a schematic diagram of a retrieving device in accordance with one or more embodiments.

FIG. 3 shows a schematic diagram showing various systems disposed in the retrieving device 300. In some embodiments, the retrieving device 300 includes embedded electronic components that enable the retrieving device 300 to perform communication functions, data collecting functions, and/or processing functions. In some embodiments, the electronic components may be temperature and pressure sensors, batteries, wireless communication capabilities and/or instrumentation capabilities. In some embodiments, one or more batteries are embedded in the retrieving device 300 to provide a rig system 400 with maximum power life and operation energy consumption. In some embodiments, various data collecting sensors, a transmitter, and a receiver are also embedded in the retrieving device 300. The various collecting sensors may collect data relating to the wellbore 120 and surrounding conditions of the retrieving device 300. The transmitter and the receiver may use available, or existing, supervisory control and data acquisition (SCADA) platforms to link the retrieving device 300 to the surface panel and/or the control system 460 to retrieve any data collected.

In one or more embodiments, the retrieving device 300 may be translated along the wellbore 120 using the conveyance mechanism 130. The retrieving device 300 may include a central aperture 350 extending around the central axis 190 and along a length of the retrieving device 300. The central aperture 350 may be configured to receive a sample of the source element 800. In some embodiments, the central aperture 350 may include layering and materials for preventing spread of radiation from a type of the source element 800 capable of spreading radioactive waves.

In particular, FIG. 3 shows a schematic including different components of the retrieving device 300. In some embodiments, the retrieving device 300 includes communication system 310, processing system 320, sensing system 330, and installation system 340. The communication system 310 may include communication devices such as a transmitter 312, a receiver 314, and localization system 316. The transmitter 312 and the receiver 314 may transmit and receive communication signals, respectively. Specifically, the transmitter 312 and the receiver 314 may communicate with one or more control systems located at a remote location. The transmitter 312 and the receiver 314 may communicate wirelessly using a wide range of frequencies. In particular, high or ultrahigh frequencies (i.e., between 10 KHz to 10 GHz) may be implemented. The localization system 316 may include one or more geospatial location identification components that collect information associated with a geospatial location of the retrieving device 300 or the logging tool 160.

The processing system 320 may include a processor 322, a memory 324, and a power supply 326. The power supply 326 may be a battery or wired connection for providing electrical energy to the retrieving device 300. In some embodiments, the battery is charged using electrical connectors (not shown). The processor 322 may perform computational processes simultaneously and/or sequentially. The processor 322 may determine information to be transmitted and processes to be performed using information received or collected. Similarly, the processor 322 may control collection and exchange of geospatial information through the localization system 316.

The sensing system 330 may include external sensors 332, internal sensors 334, and sensing processing element 336. The external sensors 332 may be sensors that collect physical data from the environment surrounding the retrieving device 300 (i.e., sensing production flow). The internal sensors 334 may be sensors that collect physical data from the retrieving device 300 itself (i.e., internal temperature, internal pressure, or internal humidity). The external sensors 332 and the internal sensors 334 may be lightweight sensors requiring a small footprint. These sensors may exchange information with each other and supply it to the processor 322 for analysis. The sensing processing element 336 may be a logging tool of an electrical type, a nuclear type, a sonic type, or another type. The sensing processing element 336 may release signals (i.e., electrical, nuclear, or sonic) through a signal generator at a sensing portion The sensing processing element 336 may collect signal feedback generated through a pulse reflection via the sensing portion. The sensing processing element 336 may use the signals to identify and track radioactive and or electromagnetic propagation going through the central aperture 350 of the retrieving device 300. The processor 322 may identify trends, characteristics or properties (i.e., such as pressure or temperature changes) relating to the flow of production fluids in the well. The power supply 326 may be operationally connected to the sensing system 330 and including connections (not shown) for collecting energy and producing electrical energy as a result.

The installation system 340 may include coordination elements 342, translation elements 344, and rotation elements 346. The translation elements 344 and the rotation elements 346 may be mechanisms that identify and track the positioning of the retrieving device 300 with respect to the logging tool 160 and the source element 800 in a three-dimensional (3D) space.

Figure 4:
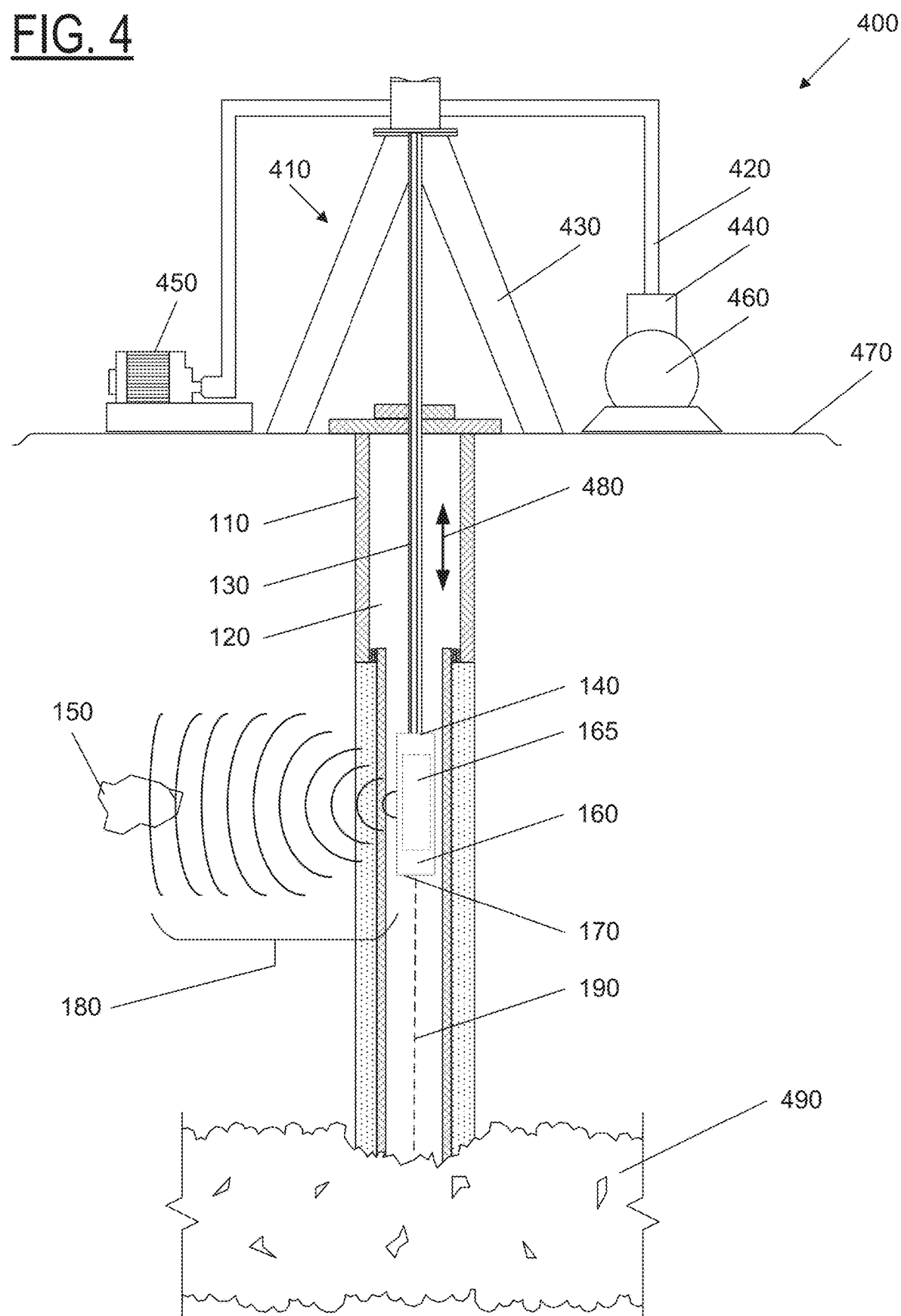
FIG. 4 shows a schematic diagram of a system including a logging tool operating in a well in accordance with one or more embodiments.

FIG. 4 shows an example of the logging tool 160 being used during well evaluation operations for a well 410 in a well system 400 in accordance to one or more embodiments. The well system 400 may include surface equipment including actuating devices 450, sensors 440, and the control system 440 connected to one another using hardware and/or software to create interfaces 420. Further, the well system 400 may be propped by structures 430 from the well surface 470. The well system 400 includes the wellbore 120 extending from the well surface 470 to an underground formation 490. The underground formation 470 may have porous areas including hydrocarbon pools that may be accessed through the wellbore 120. In some embodiments, the logging tool 160 is translated in a vertical direction 480 along the wellbore 120 using the surface equipment.

The well system 400 includes the well 410 extending below the earth surface into the underground formation ("formation") 490. The formation 490 may include a porous or fractured rock. A subsurface pool of hydrocarbons, such as oil and gas, also known as a reservoir, may be located in the formation 490. The well 410 includes the wellbore 120 that extends from a wellhead at the surface to a target zone in the formation 490—the target zone may be where the reservoir (not shown separately) is located. The well 410 may further include the casing 110 lining the wellbore 120. In the illustrated example, the casing 110 extends into the portion of wellbore 120 penetrating the formation 490. In other implementations, the portion of wellbore 120 penetrating formation 490 may be uncased or open, and fluid communication between the formation 490 and the well 410 may occur through an open wall section of the well 410.

The wellbore 120 may facilitate the circulation of drilling fluids during drilling operations. The flow of hydrocarbon production ("production") (e.g., oil and gas) from the reservoir to the surface during production operations, the injection of substances (e.g., water) into the formation 490 or the during injection operations, or the communication of monitoring devices (e.g., logging tools or logging devices) into the formation 490 or the reservoir during monitoring operations (e.g., during in situ logging operations).

The well system 400 may include the well control system ("control system") 460. In some embodiments, during operation of the well system 400, the control system 460 may collect and record wellhead data for the well system 400. The control system 460 may include flow regulating devices that are operable to control the flow of substances into and out of the wellbore 120. For example, the control system 460 may include one or more production valves (not shown separately) that are operable to control the flow of production in the well system 400 during well completion operations, well maintenance operations, and reservoir monitoring, assessment and development operations. In some embodiments, the control system 460 may regulate the movement of the conveyance mechanism 130 by modifying the power supplied to the actuating devices 450. The conveyance mechanism 130 may be a fishing line or a fishing tool coupling the logging tool 160 to the structures 430. The conveyance mechanism 130 may be a special mechanical device used to aid the deployment of re-entry or milling operations in the well 410. In some embodiments, the well control system 460 includes the surface panel described in reference to FIG. 1.

The control system 460 may include a reservoir simulator (not shown). The reservoir simulator may include hardware and/or software with functionality for generating one or more reservoir models regarding the formation 490 and/or performing one or more reservoir simulations. The reservoir simulator may perform production analysis and estimation based on one or more characteristics associated to the formation 490. Further, the reservoir simulator may include a memory for storing well logs and data regarding core samples for performing simulations. While the reservoir simulator may be included in the control system 460 at a well site, the reservoir simulator may be located away from the well site. In some embodiments, the reservoir simulator may include a computer system disposed to estimate a depth of the logging tool 160 at any given time. The reservoir simulator may use the memory for compiling and storing historical data about the well 410. The historical data may be information including reservoir depth, well production rate, packer depth, and/or casing depth.

In some embodiments, the actuating devices 450 may be motors or pumps connected to the conveyance mechanism 130 and the control system 460. The control system 460 may be coupled to the sensors 440 to sense characteristics of substances and conditions in the wellbore 120, passing through or otherwise located in the well system 400. The sensors 440 may include a surface pressure sensor operable to sense the pressure of production flowing to the control system 460, after it exits the wellbore 120. Further, for example, the sensors 440 may include a surface temperature sensor including, for example, a wellhead temperature sensor that senses a temperature of production flowing through or otherwise located in the wellhead, referred to as the "wellhead temperature" ($T_{wh}$). In some embodiments, for example, the sensors 440 include a flow rate sensor operable to sense the flow rate of production flowing through the control system 460, after it exits the wellbore 120. The flow rate sensor may include hardware that senses the flow rate of production ($Q_{wh}$) passing through the wellhead.

In some embodiments, the measurements are recorded in real-time, and are available for review or use within seconds, minutes or hours of the condition being sensed (e.g., the measurements are available within 1 hour of the condition being sensed). In such an embodiment, the wellhead data may be referred to as "real-time" wellhead data. Real-time data may enable an operator of the well system 400 to assess a relatively current state of the well system 400, and make real-time decisions regarding development of the well system 400 and the reservoir, such as on-demand adjustments in regulation of production flow from the well 410.

In some embodiments, the logging tool 160 may be configured for nuclear logging. Nuclear logging may be used to collect and analyze measurement of natural and induced nuclear readings. The logging tool 160 may perform log analysis to map out values of reservoir characteristics such as porosity, fluid saturations, and permeability. The logging tool 160 may measure gamma ray or neutron count rates penetrating in areas surrounding the wellbore 120. The logging tool 160 may detect the presence of unstable isotopes, or that create such isotopes in the vicinity of wellbore 120.

Figure 5:
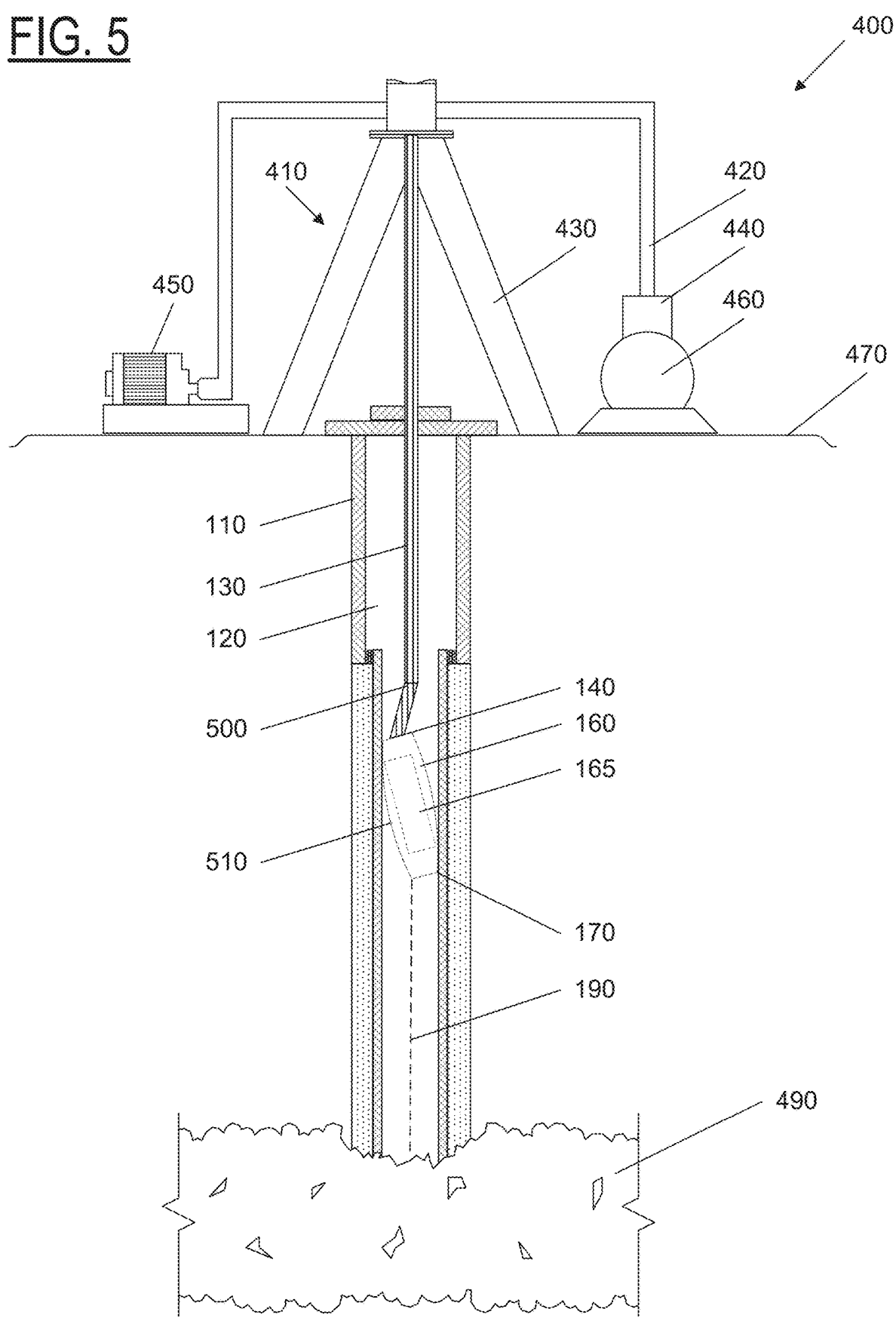
FIG. 5 shows a schematic diagram of a system including a logging tool that is stuck in a well in accordance with one or more embodiments.

FIG. 5 shows a schematic diagram illustrating the logging tool 160 being stuck in the wellbore 120 according to one or more embodiments. The conveyance mechanism 130 may malfunction by operating in an unintended way. The malfunction may cause the logging tool 160 to get stuck at a depth of the wellbore 120. As an example, FIG. 5 shows the logging tool 160 and the conveyance mechanism 139 stuck in a deformed position. In the deformed position, the conveyance mechanism 130 may include a deformed portion 500. Further, in the deformed position, the logging tool 160 may include a deformed housing 510 that remains unaligned with respect to the central axis 190. In the deformed position, the deformed housing 510 may affect the integrity of the central chamber 165.

In FIGS. 4 and 5, the logging tool 160 may perform measurements that enable the logging tool 160 to perform well evaluation operations using a source element 800 and one or more logging techniques (i.e., such as nuclear logging). The logging tool 160 may stop performing measurements once the logging tool 160 reaches a deformed position.

Figure 6:
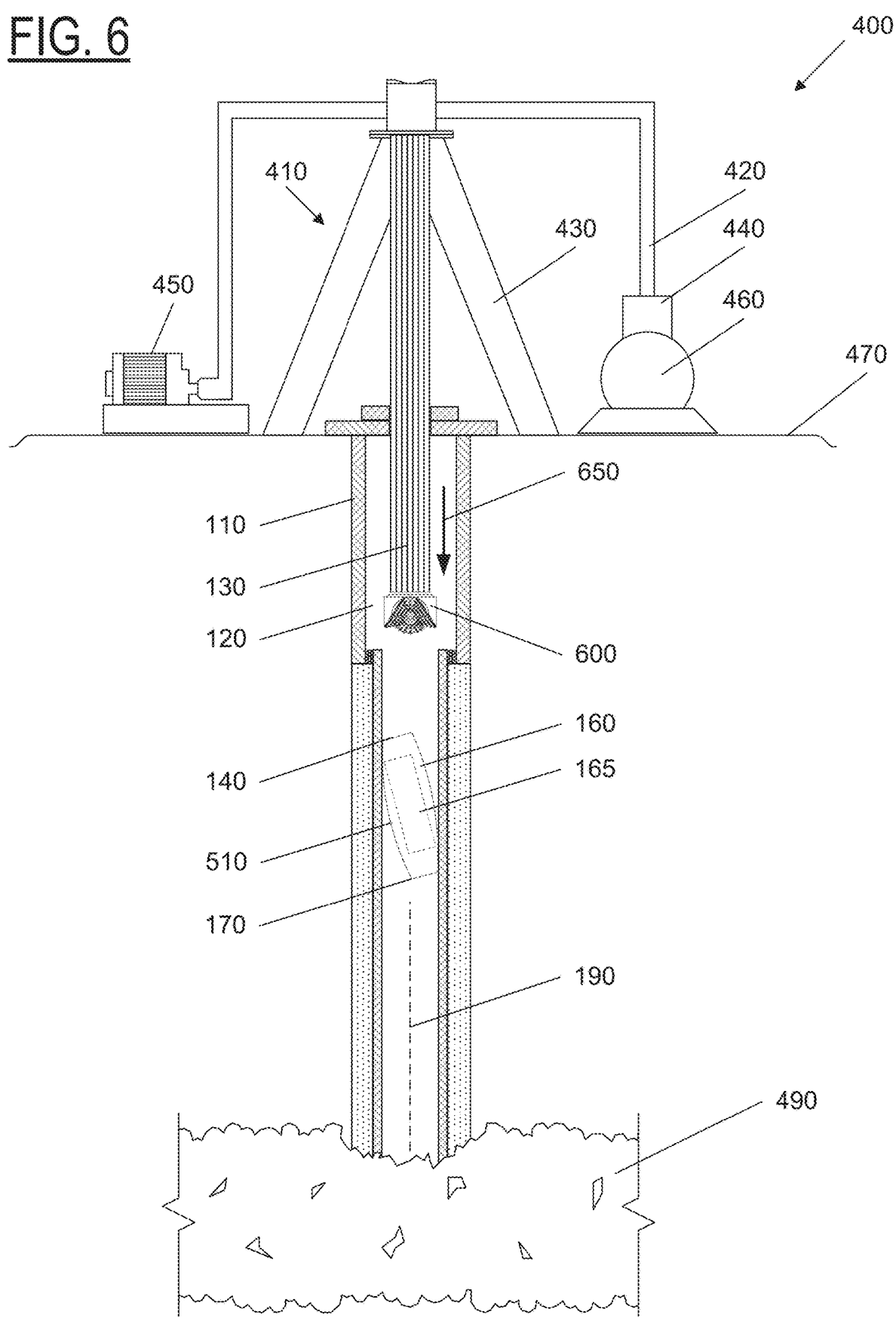
FIG. 6 shows a schematic diagram of a system including a logging tool that is stuck in a well in accordance with one or more embodiments.
Figure 7:
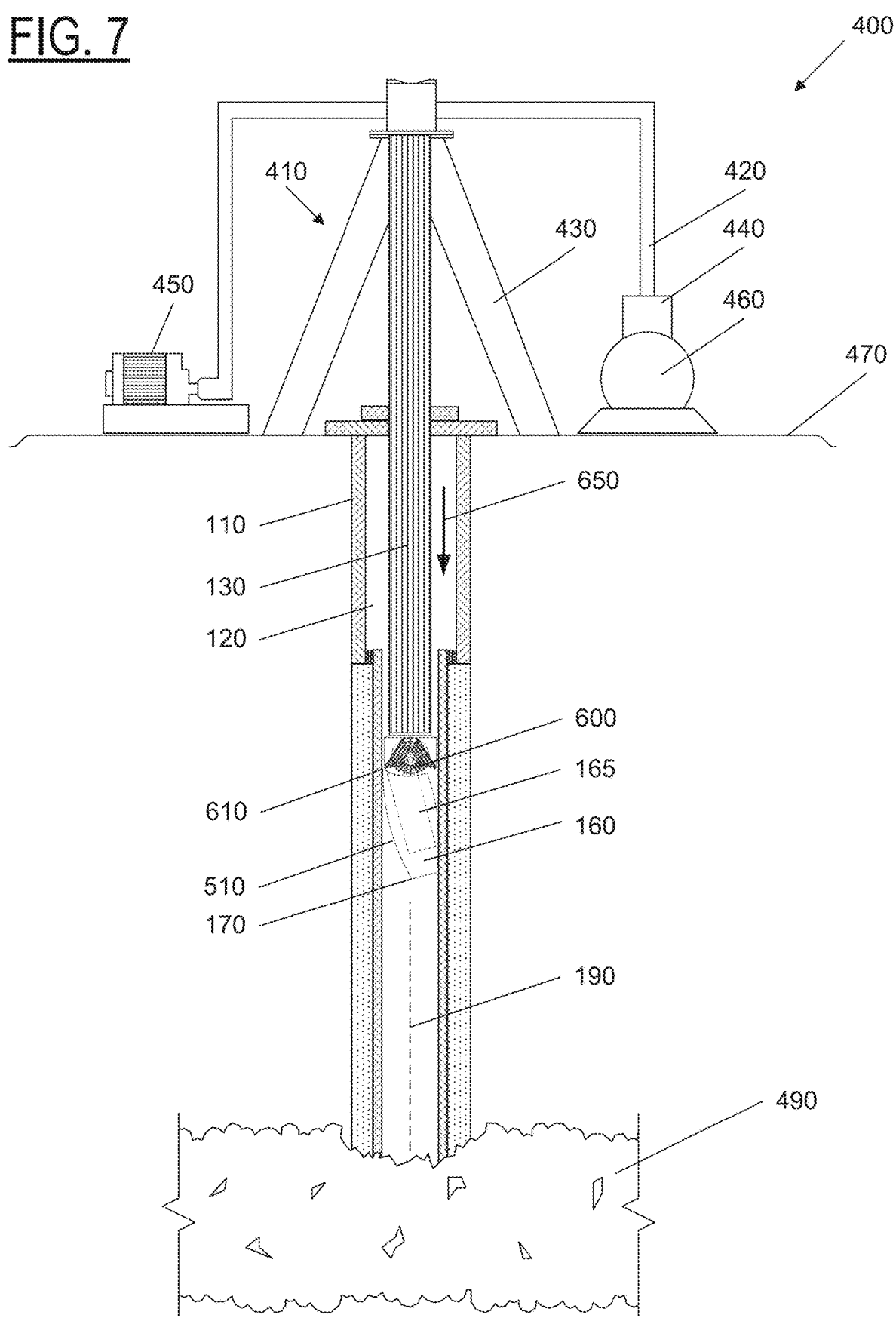
FIG. 7 shows a schematic diagram of a system including a logging tool that is stuck in a well in accordance with one or more embodiments.
Figure 8:
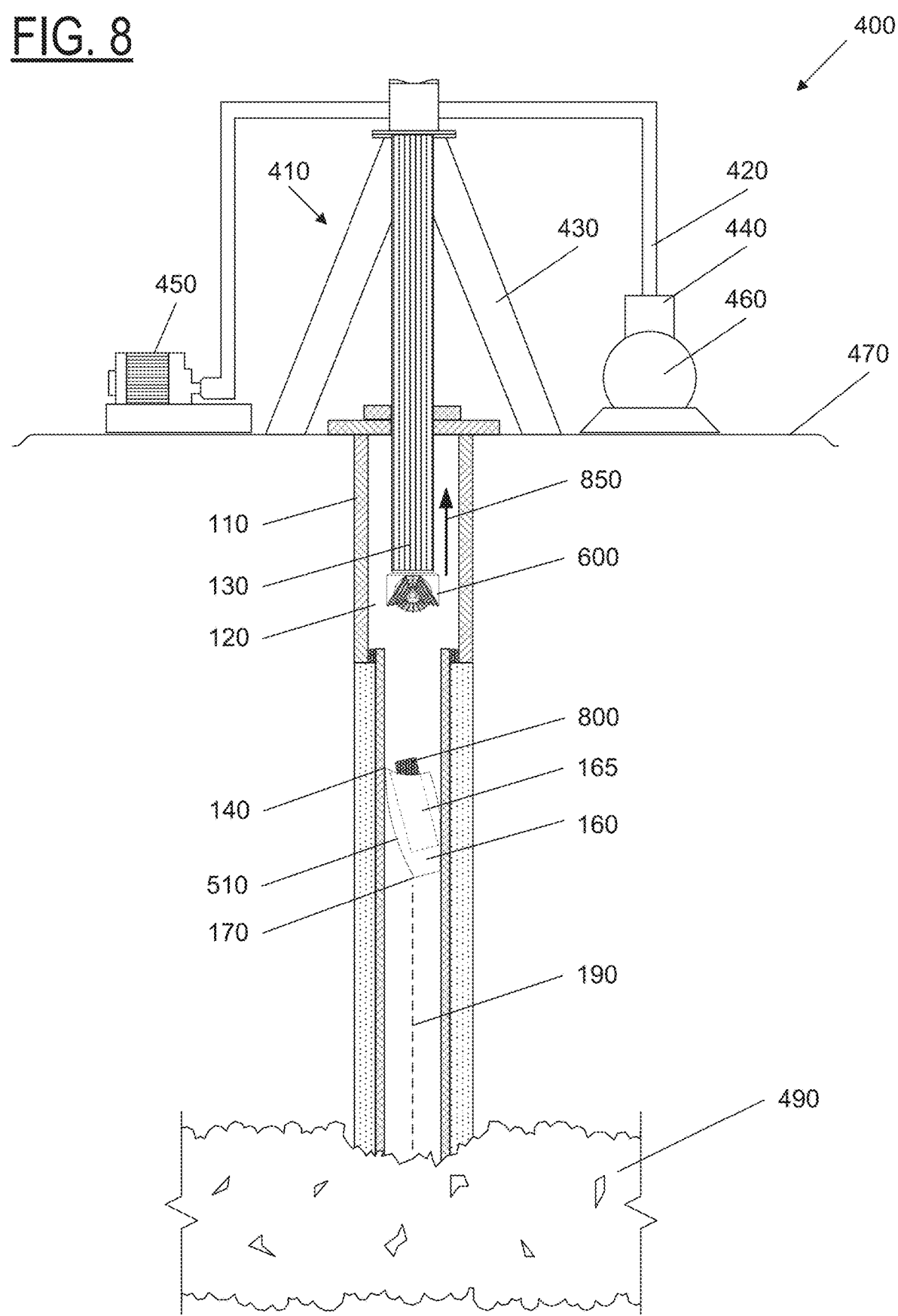
FIG. 8 shows a schematic diagram of a system including a source element in a logging tool that is stuck in a well in accordance with one or more embodiments.

In FIGS. 6-8, the milling tool 600 is configured for lowering down to a depth that enables retrieving of the source element 800 by the retrieving device 300 in accordance to one or more embodiments.

FIG. 6 illustrates a milling tool 600 configured to mill the top portion 140 of the deformed housing 510 of the logging tool 160 in accordance to one or more embodiments. The milling tool is lowered in a downward direction 650 along the wellbore 120. As the milling tool 600 mills downward, the milling tool 600 drills through every component in the wellbore 120 based on actuating controlled and monitored by the control system 460. The milling tool 600 is lowered to the depth at which the deformed housing 510 is located. In some embodiments, the control system 460 maintains the communication link previously established with the logging tool 160 and receives information including a proximity of the logging tool 160 to a drill bit head of the milling tool. In some embodiments, the milling tool is configured for detecting radiation or electromagnetic signatures (i.e., a specific pattern of waves and/or pulses) representative of an intensity of the source element 800. In this case, the milling tool 600 may automatically identify and determine the proximity of the source element 800 in the logging tool 160.

FIG. 7 illustrates the milling tool 600 milling through the top portion 140 of the deformed housing 510 of the logging tool 160 in accordance to one or more embodiments. The milling tool 600 mills until a depth containing the central chamber 165 is reached. At this point, the source element 800 is exposed to the wellbore 120. The logging tool 160 is manufactured from a non-metallic material as described above allowing for the logging tool 160 to be milled without breaking or clogging the milling tool 600. The control system 460 may control the speed and depth at which the milling tool 600 drills. Similarly, the control system may communicate with the logging tool 160 to identify whether the milling tool has reached the central chamber 165 as it moves in the downward direction 650.

FIG. 8 illustrates the milling tool 600 moving away from the deformed housing 510 of the logging tool 160 in accordance to one or more embodiments. The milling tool 600 is removed from the wellbore 120 by moving the conveyance system 130 in an upward direction 850. At this stage, the top portion 140 of the logging tool 160 and the central chamber 165 are milled such that the source element 800 is exposed.

Figure 9:
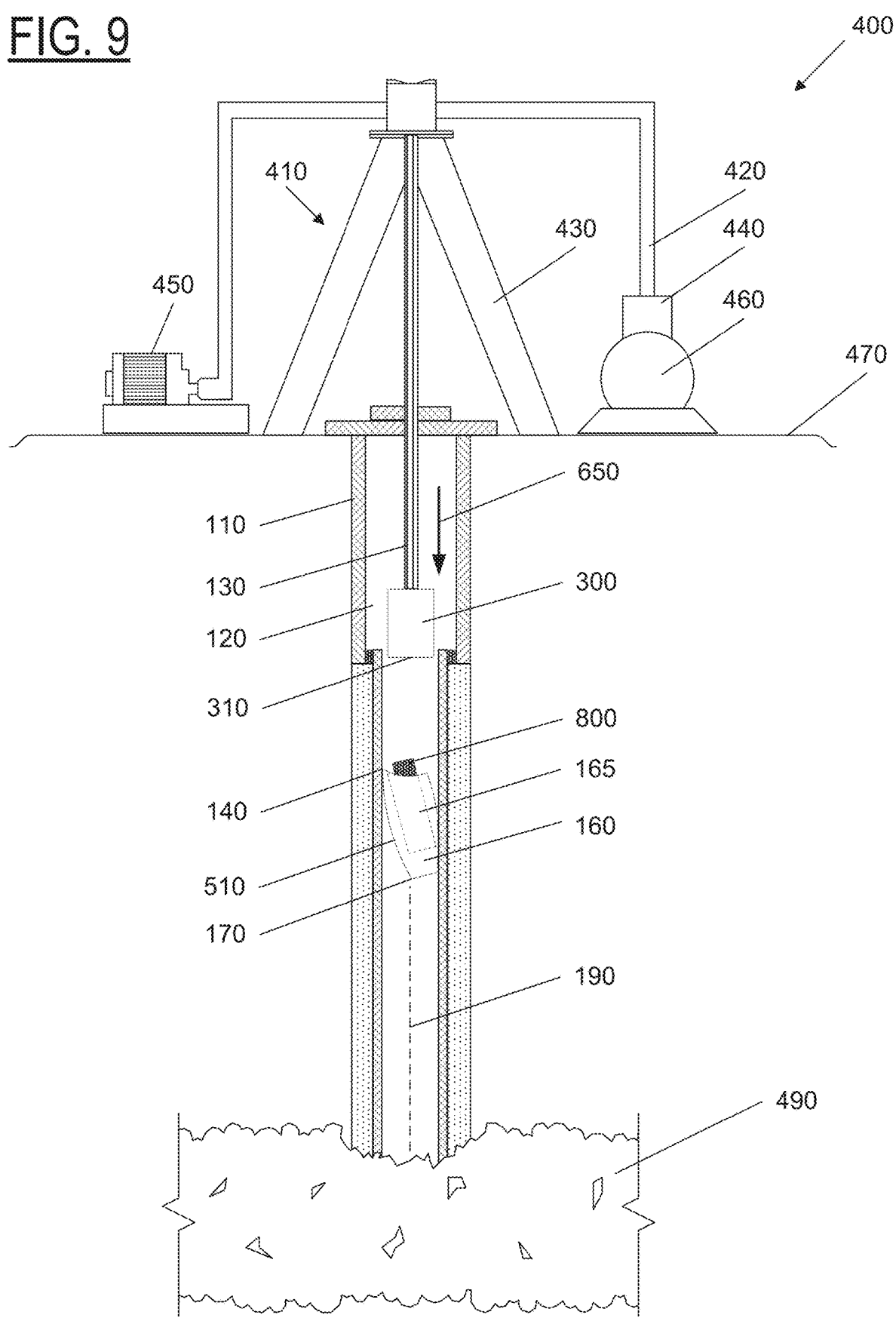
FIG. 9 shows a schematic diagram of a system including a retrieving device retrieving a source element from a logging tool that is stuck in a well in accordance with one or more embodiments.
Figure 10:
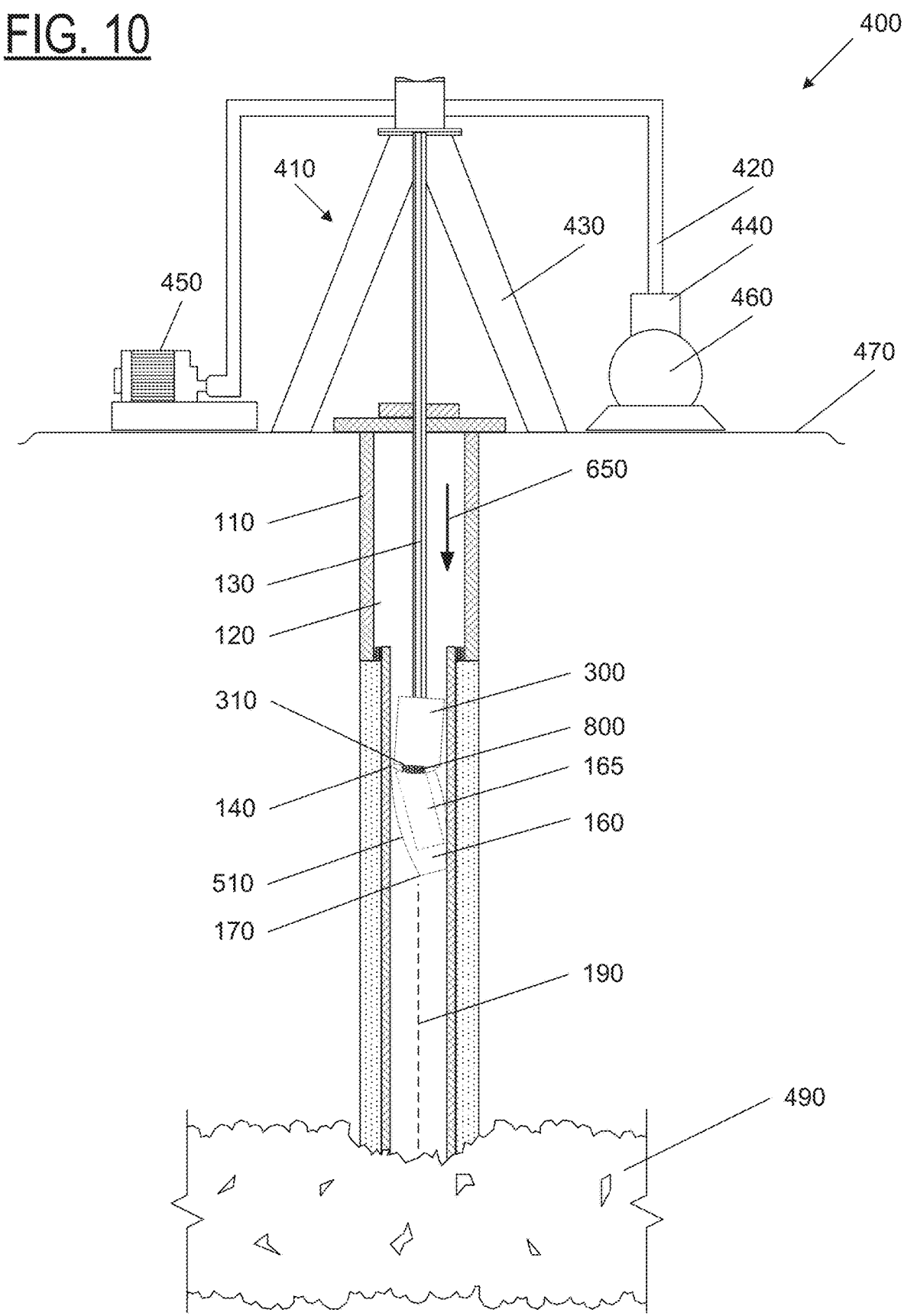
FIG. 10 shows a schematic diagram of a system including a retrieving device retrieving a source element from a logging tool that is stuck in a well in accordance with one or more embodiments.
Figure 11:
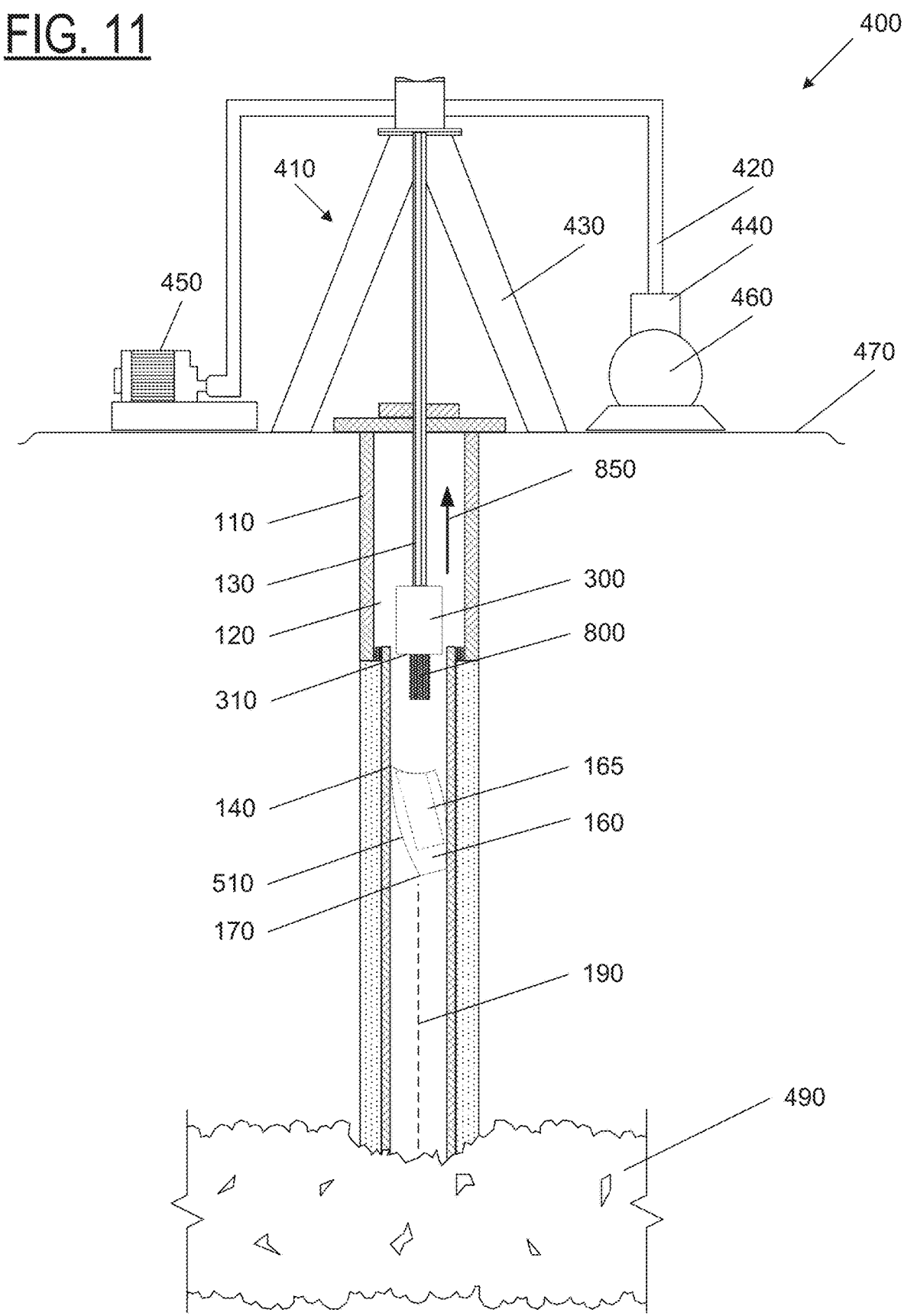
FIG. 11 shows a schematic diagram of a system including a retrieving device retrieving a source element from a logging tool that is stuck in a well in accordance with one or more embodiments.

In FIGS. 9-11, the milling tool 600 is configured for lowering down to a depth that enables retrieving of the source element 800 by the retrieving device 300 in accordance to one or more embodiments.

FIG. 9 illustrates the retrieving device 300 being lowered into the wellbore 120 in accordance to one or more embodiments. The retrieving device 300 is lowered following the downward direction 650 such that the central aperture 350 is aligned with the source element 800. The retrieving device 300 may use communication system 310 to coordinate the positioning of the retrieving device 300 with respect to the source element 800. Specifically, the retrieving device 300 may be aligned at an angle from the central axis 190 such that central aperture 350 may engage with an entire outer diameter of the source element 800 in the central chamber 165 of the logging tool 160.

FIG. 10 illustrates the retrieving device 300 engaging the source element 800 in the wellbore 120 in accordance to one or more embodiments. The source element 800 is engaged by the retrieving device 300 in a direction that allows the source element 800 to be removed from the central chamber 165 in the logging tool 160. The source element 800 may be engaged using claws, friction, and/or concurrent sealing rings (not shown) disposed in the central aperture 350.

FIG. 11 illustrates the retrieving device 300 being raised with the source element 800 along the wellbore 120 in accordance to one or more embodiments. The retrieving device 300 is translated in the upward direction 850 once the source element 800 is engaged in the central aperture 350 of the retrieving device 300. In some embodiments, the source element 800 is completely removed from the central chamber 165 of the logging tool 160.

Figure 12:
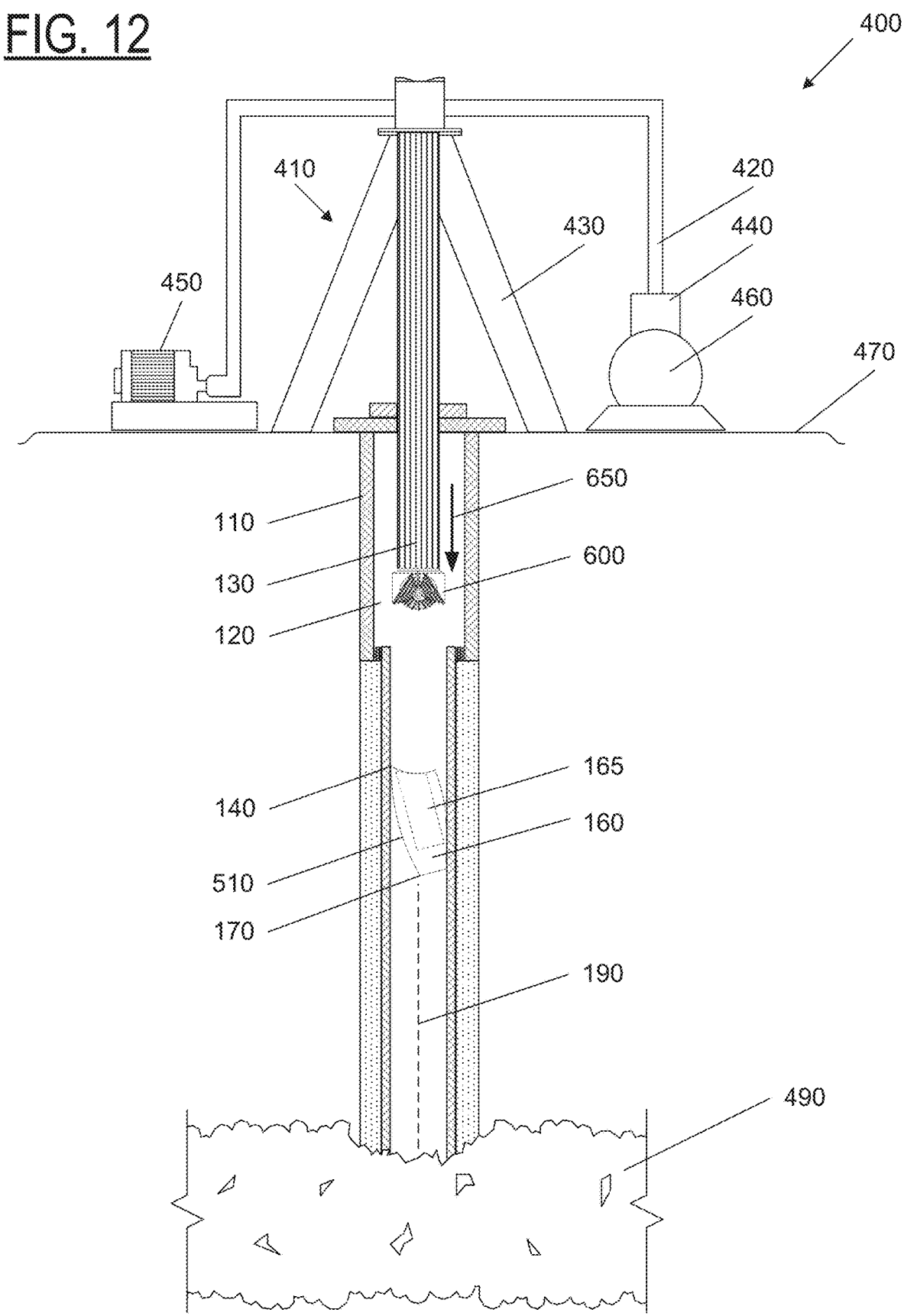
FIG. 12 shows a schematic diagram of a system including a milling tool drilling through a logging tool that is stuck in a well in accordance with one or more embodiments.
Figure 13:
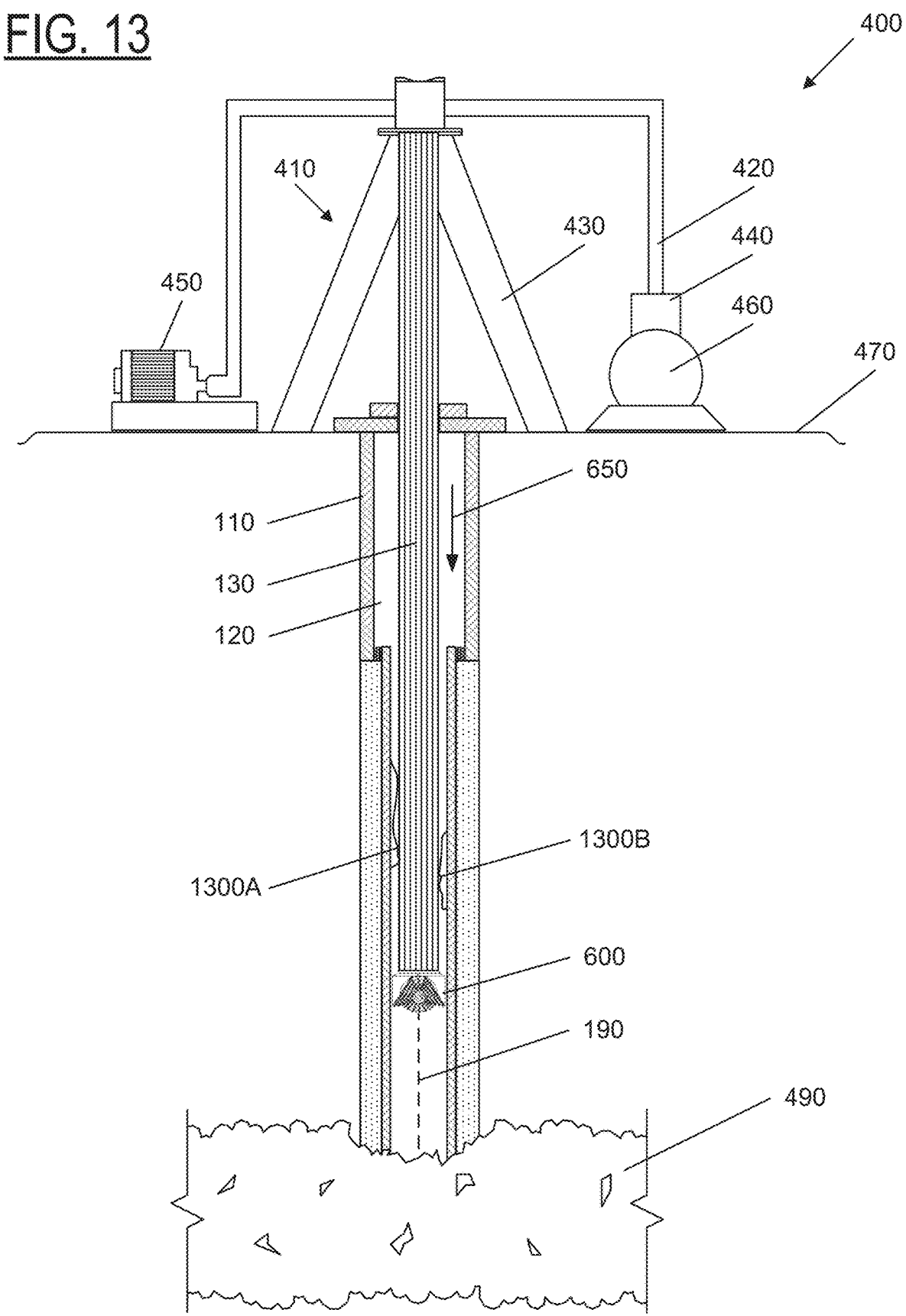
FIG. 13 shows a schematic diagram of a system including a milling tool drilling through a logging tool that is stuck in a well in accordance with one or more embodiments.

In FIGS. 12 and 13, the logging tool 160 may be drilled or milled through such that an entirety of the logging tool 160 may be fully destroyed by running the milling tool 600 in the downward direction 650. As the source element 800 is fully removed, debris generated from milling the logging tool 160 may be completely milled-through without concerns of spreading radioactive or electromagnetic material into the wellbore 120. FIG. 12 illustrates the milling tool 600 being lowered in accordance to one or more embodiments. FIG. 13 illustrates the milling tool 600 milling through the deformed housing 510 of the logging tool 160 in accordance to one or more embodiments. As such, as the milling tool 600 breaks through the logging tool 160 creating non-metallic debris 1300A and 1300B.

Figure 14:
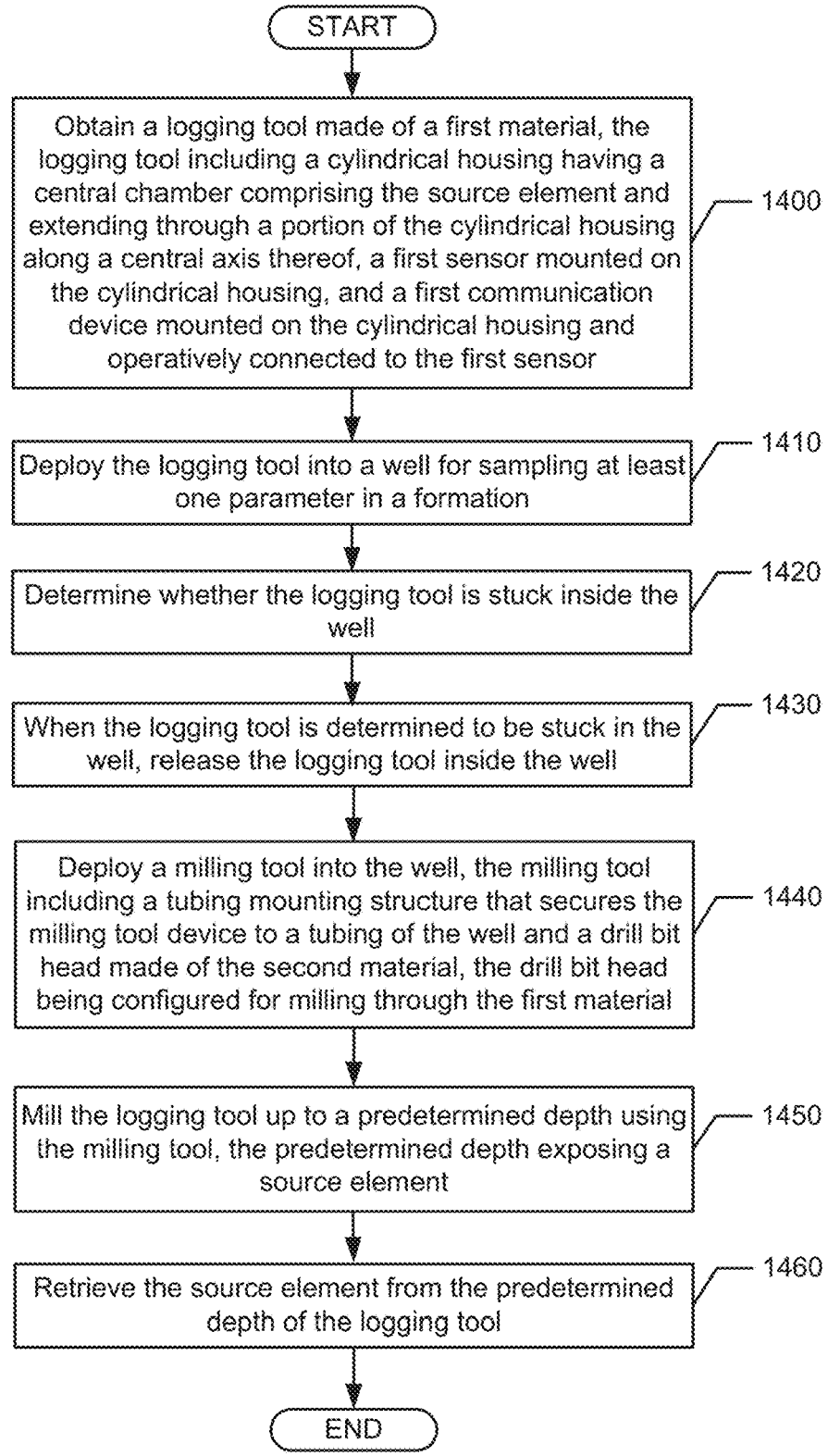
FIG. 14 shows a flowchart in accordance with one or more embodiments.

FIG. 14 shows a flowchart in accordance with one or more embodiments. Specifically, FIG. 14 describes a method for retrieving the source element 800 from the logging tool 160 located in the well 410. In some embodiments, the method may be implemented using the control system 460 of the well system 400 and/or the processing system 220 of the logging tool 160 described in reference to FIGS. 1-13. Further, one or more blocks in FIG. 14 may be performed by one or more components as described in FIG. 14 (e.g., the communication system 210 located of the logging tool 160 and the communication system 310 of the retrieving device 300). While the various blocks in FIG. 6 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1400, the logging tool 160 is obtained. The logging tool 160 may be made of a non-metallic material, the logging tool 160 may include a cylindrical housing having the central chamber 165 comprising the source element 800, and the logging tool 160 may be extending through a portion of the cylindrical housing along the central axis 190 thereof. The logging tool 160 may include at least one sensor mounted on the cylindrical housing, and at least one communication device mounted on the cylindrical housing and operatively connected to the at least one sensor.

In Block 1410, the logging tool 160 is deployed into the well 410 for sampling at least one parameter in the formation 490. At this point, the logging tool 160 uses the source element 800 to generate various pulses 180 directed to a point of interest 150 outside the casing 110. The logging tool 160 collects responses and/or feedback signals from the point of interest 150.

In Block 1420, it is determined whether the logging tool 160 is stuck inside the well 410. The control system 460 may monitor and modify the consistency of the logging tool 160 and the components therein such that the logging tool 160 may be monitored to identify changes in the weigh and spacing of the central chamber 165 where the source element 800 is located.

In Block 1430, when the logging tool 160 is determined to be stuck in the well, the logging tool 160 is released inside the well. The logging tool 160 and the control system 460 may use one or more sensors to determine whether the logging tool 160 is stuck.

In Block 1440, the milling tool 600 is deployed into the well 410, the milling tool 600 includes a tubing mounting structure that secures the milling tool 600 to a tubing of the well 410 and a drill bit head made of a metallic material. The drill bit head may be configured for milling through non-metallic material.

In Block 1450, the logging tool 160 is milled up to a predetermined depth using the milling tool 600, the predetermined depth exposing the source element 800. As the logging tool 160 is milled, the central chamber 165 is milled alongside as the milling tool 600 moves in the downward direction 650.

In Block 1460, the source element 800 is retrieved from the predetermined depth of the logging tool 160. The source element 800 is retrieved using the retrieving device 300.

While FIGS. 1-14 show various configurations of components, other configurations may be used without departing from the scope of the disclosure. For example, various components in FIG. 4-13 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A system for retrieving a source element from a well, the system comprising:
    a logging tool made of a first material, comprising:
        a cylindrical housing having a central chamber housing the source element and extending through a portion of the cylindrical housing along a central axis thereof, and
        a first communication device mounted on the cylindrical housing,
    a milling tool, comprising:
        a drill bit head made of a second material, the drill bit head being configured for milling through the first material; and
    a control device comprising:
        a second communication device configured to communicate with the first communication device, and
        a processor operatively connected to the second communication device that coordinates a position of the milling tool with respect to the central chamber of the logging tool comprising the source element.

2. The system of claim 1, wherein the source element comprises a radioactive material.

3. The system of claim 1, wherein the logging tool and the milling tool are configured to be lowered into the well using a conveyance mechanism.

4. The system of claim 3, wherein the conveyance mechanism is a wireline or a slickline.

5. The system of claim 1, wherein the milling tool mills from a top portion of the logging tool to a top portion of the central chamber.

6. The system of claim 5, wherein the central chamber comprises a fish-neck profile that positions the source element for retrieval.

7. The system of claim 2, wherein the radioactive material is retrieved without removing the logging tool.

8. A method for retrieving a source element from a well, the source element being located in a logging tool made of a first material that is deployed into the well for sampling at least one parameter in a formation, the logging tool comprising: a cylindrical housing having a central chamber comprising the source element and extending through a portion of the cylindrical housing along a central axis thereof, and a first communication device mounted on the cylindrical housing, the method comprising:
    determining whether the logging tool is stuck inside the well;
    when the logging tool is stuck inside the well, releasing the logging tool inside the well;
    deploying a milling tool made of a second material, the milling tool comprising:
        a drill bit head made of the second material, the drill bit head being configured for milling through the first material;
    milling the logging tool up to a predetermined depth using the milling tool, the predetermined depth exposing a source element; and
    retrieving the source element from the predetermined depth of the logging tool.

9. The method of claim 8, wherein the source element is a radioactive material.

10. The method of claim 8, wherein the logging tool and the milling tool are configured to be lowered into the well using a conveyance mechanism.

11. The method of claim 10, wherein the conveyance mechanism is a wireline or a slickline.

12. The method of claim 8, wherein the milling tool mills from a top portion of the logging tool to a top of the central chamber.

13. The method of claim 12, wherein the central chamber comprises a fish-neck profile that positions the source element for retrieval.

14. The method of claim 9, wherein the radioactive material is retrieved without removing the logging tool.

15. A logging tool of a first material configured to be milled through by a drill bit head made of a second material and disposed on a milling tool, the logging tool comprising:
   a cylindrical housing made of the first material and having a central chamber extending through a portion of the cylindrical housing along a central axis thereof,
   a source element disposed in the central chamber, and
   a communication device mounted on the cylindrical housing and operatively connected to a first sensor,
   wherein a top portion of the logging tool is configured to be milled by the milling tool to expose a top of the central chamber, and wherein the central chamber comprises a fish-neck profile that positions the source element for retrieval after the top portion of the logging tool is removed.

16. The logging tool of claim 15, wherein the source element comprises a radioactive material.

17. The logging tool of claim 15, wherein the logging tool and the milling tool are configured to be lowered into the well using a conveyance mechanism.

18. The logging tool of claim 17, wherein the conveyance mechanism is a wireline or a slickline.

* * * * *